United States Patent [19]
Wilger et al.

[11] 3,889,714
[45] June 17, 1975

[54] PIPE CLOSURE APPARATUS

[75] Inventors: John F. Wilger; Tadao S. Uyetake; Clifford Y. C. Lai, all of Honolulu, Hawaii

[73] Assignee: The United States of America as represented by the Secretary of the Navy, Washington, D.C.

[22] Filed: Jan. 17, 1974

[21] Appl. No.: 434,169

[52] U.S. Cl. .............................................. 138/89
[51] Int. Cl. ............................................ F16l 55/10
[58] Field of Search ...... 138/89; 4/286; 137/247.47, 137/247.51

[56] References Cited
UNITED STATES PATENTS
2,993,616  7/1961  Carlile, Jr. et al. ............... 138/89 X FOREIGN PATENTS OR APPLICATIONS
1,804,952  6/1970  Germany ............................ 138/89
625,437    8/1961  Canada .............................. 138/89
624,858    1/1936  Germany ............................ 138/89
366,261    2/1932  United Kingdom ................. 138/89
373,944    6/1932  United Kingdom ................. 138/89

Primary Examiner—Stanley N. Gilreath
Attorney, Agent, or Firm—Richard S. Sciascia; Ervin F. Johnston

[57] ABSTRACT

A pipe closure apparatus which includes a resilient plug and a threaded shaft which extends axially through the plug. Means are mounted on one end of the shaft to restrain longitudinal movement of the shaft in respect to the resilient plug, and a nut is threaded on the opposite end of the shaft so that upon tightening or loosening the nut the resilient plug expands or retracts respectively. A rigid washer is slidably mounted on the shaft between the nut and the resilient plug for providing bearing surfaces and a distribution of force from the nut to the resilient plug. A cup shaped resilient ring is mounted about the washer. The ring has an exterior diameter which is greater than the resilient plug when the plug is in its retracted condition and is capable of flexing inwardly. With such an arrangement the pipe closure apparatus can be utilized to seal a pipe from contamination by expanding the plug therein and to wipe the pipe clean with the resilient ring when the plug is retracted and withdrawn. The pipe closure apparatus may also include means for retaining the shaft and selectively tightening or loosening the nut.

3 Claims, 4 Drawing Figures

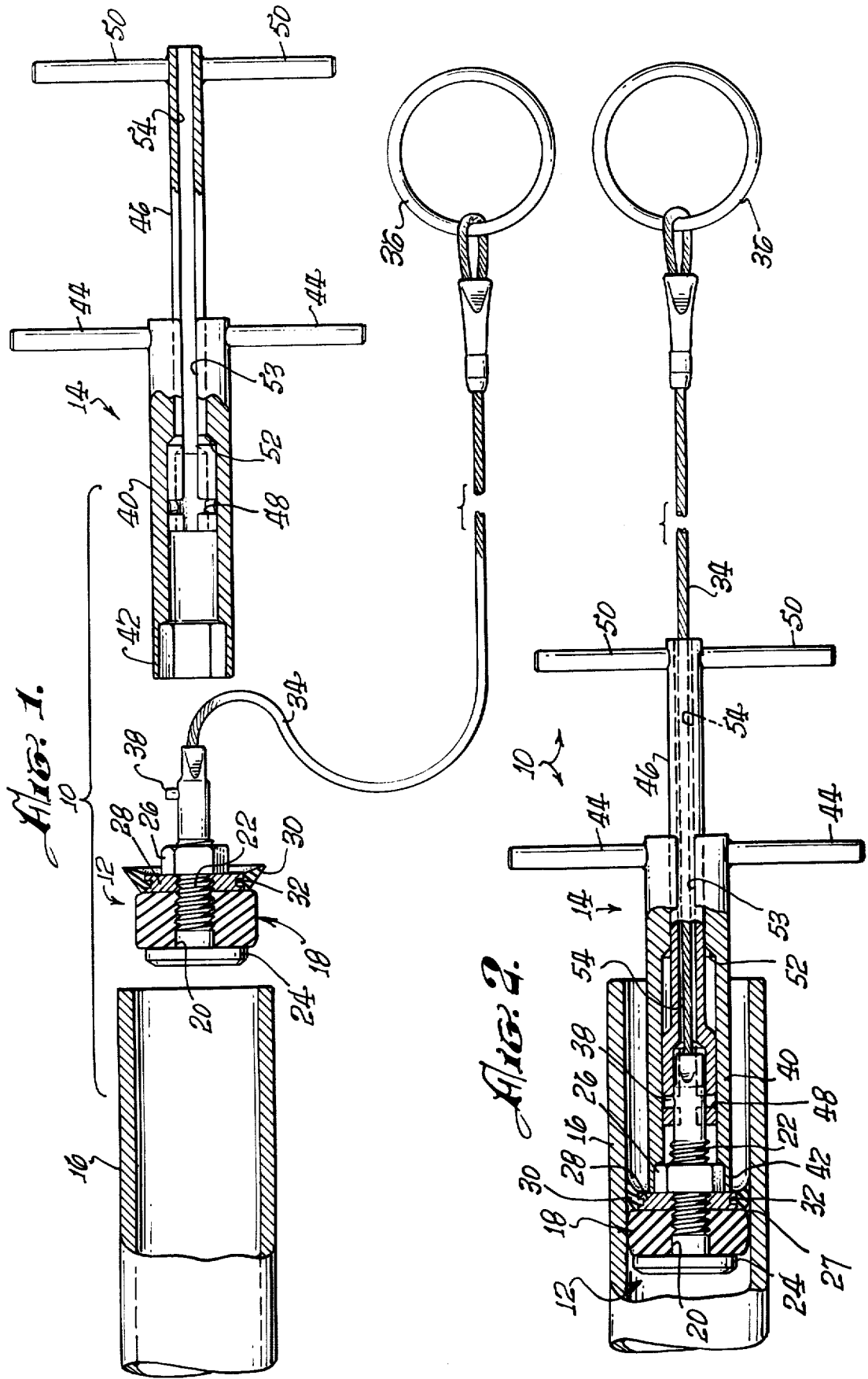

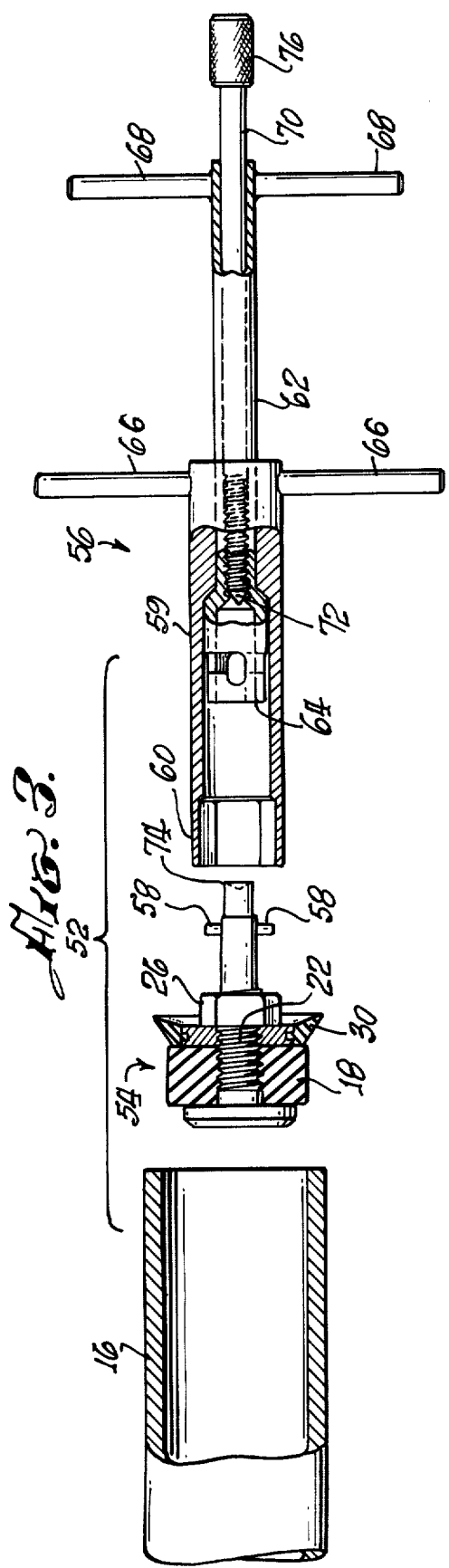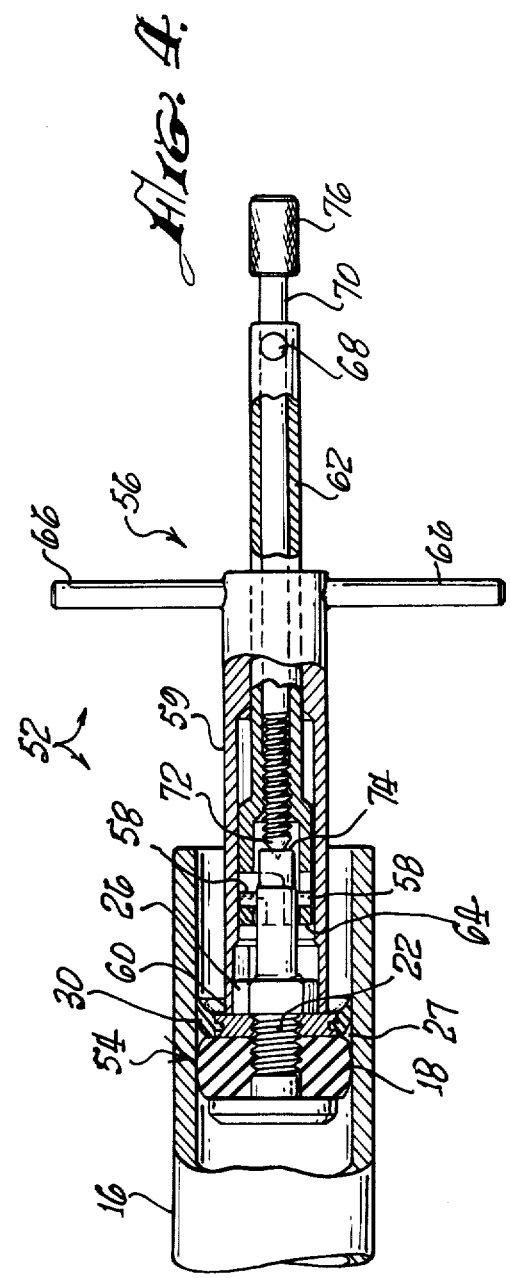

PIPE CLOSURE APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Navy ships and boats are periodically scheduled for maintenance and overhaul work in various shipyards. When these ships are in the yards it is common practice to seal certain pipes to maintain their cleanliness while either the pipe is being refurbished or while work is being conducted in the surrounding area. It is a requirement that some of these pipes be kept entirely free from contamination while this work is being conducted. Work in the surrounding area causes a contamination of the atmosphere which exposes the pipe openings to foreign particles, and sometimes the end of the pipe must be machined which will cause metal particles to fall into the interior of the pipe.

A previous type of pipe closure has simply included a rubber plug, bolt, nut, and washers. The bolt extends through the rubber plug with a washer on one end and a washer and the nut on the other end. When the nut is tightened the rubber plug expands outwardly in the shape of a torus where a major diameter engages the interior diameter of the pipe to consummate a closure. A serious problem is encountered with this type of pipe closure in that the torus shape of the plug and the interior wall of the pipe form a crevice in which minute foreign particles can be lodged. Vacuum cleaning in this crevice has not been satisfactory in removing all of the foreign particles. During removal of the plug the foreign particles fall into the system which causes the cleanliness integrity to be lost.

A further problem with prior art pipe closures has been the unauthorized removal of them from the pipes which causes a contamination thereof.

SUMMARY OF THE INVENTION

The present invention overcomes the aforementioned problems associated with the prior art pipe closure apparatus by providing an improvement thereto. A cup shaped resilient ring is mounted about the aforementioned washer which is located between the nut and the resilient plug. This ring has an exterior which is greater than the resilient plug when the plug is in its retracted condition and is capable of flexing inwardly. With such an arrangement the pipe can be sealed from contamination by expanding the plug therein and the pipe is wiped clean by the ring when the plug is retracted and withdrawn. In order to overcome the problem of unauthorized removal of the pipe closure a particular wrench means is provided for retaining the shaft and selectively tightening or loosening the nut on the pipe closure. The wrench means includes a tube which has a shaped end for engaging the nut, a pin which extends from the shaft, and another tube which is slidable within the first mentioned tube and has a shaped end for engaging the pin. Counter rotation of the tubes will cause a tightening or loosening of the pipe closure within the pipe. One embodiment of the wrench means is utilized for operating a plug where work is done in the environment around the pipe, and another wrench means is utilized for operating a plug where machine work is done on the end portion of the pipe.

OBJECTS OF THE INVENTION

An object of the present invention is to provide a pipe closure apparatus which overcomes the aforementioned problems associated with prior art pipe closure apparatuses.

A further object is to provide a pipe closure which will wipe a pipe clean when it is withdrawn from the pipe.

Another object is to provide a pipe closure apparatus which includes a wrench means and which will maintain the cleanliness integrity of the pipe when the surrounding environment is contaminated.

Still another object is to provide a pipe closure apparatus which includes a wrench means and which will maintain the cleanliness integrity of the pipe when an end portion of the pipe is machined.

These and other objects of the invention will become more readily apparent from the ensuing specification when taken with the drawings.

DESCRIPTION OF THE DRAWINGS

FIG. 1 is a side view shown partially in cross section of one embodiment of the pipe closure apparatus, including a resilient plug and wrench, which is removed from a pipe wherein work in the environment surrounding the pipe opening will cause contamination.

FIG. 2 is an illustration of the same components as illustrated in FIG. 1 with the resilient plug inserted in the pipe in an expanded condition and the wrench in engagement with the plug for tightening or loosening the plug.

FIG. 3 is a side view shown partially in cross section of another embodiment of the pipe closure apparatus, including a resilient plug and wrench, removed from the pipe where machining work is to be accomplished on an end portion of the pipe.

FIG. 4 is an illustration of the components in FIG. 3 with the resilient plug expanded within the pipe and the wrench in engagement with the plug for tightening or loosening the plug.

DESCRIPTION OF THE PREFERRED EMBODIMENTS

Referring now to the drawings wherein like reference numerals designate like or similar parts throughout the several views there is illustrated in FIG. 1 a pipe closure apparatus 10 which includes a closure means 12 and a wrench means 14. The pipe closure apparatus is utilized for sealing off and preventing any contamination of a pipe 16. The closure means 12 may include a resilient plug 18 which may be generally cylindrical and may be provided with a hole 20 along its longitudinal axis. The resilient plug 18 may be made of Buna rubber so as to be resistant to deterioration from petroleum products.

Extending axially through the plug 18 within the hole 20 is a threaded shaft 22. Means are mounted on one end of the shaft 22 to restrain longitudinal movement of the shaft with respect to the resilient plug 18. This means may be a rigid disc 24 which may be rigidly connected to the threaded shaft 22. A nut 26 is threaded on the opposite end of the shaft so that upon tightening or loosening the nut the resilient plug 18 expands or retracts respectively. In this manner the plug 18 will expand upon tightening the nut 26 to seal the pipe 16, or upon loosening the nut 26 the plug 18 will retract so that it can be withdrawn.

It should be noted from FIG. 2 that when the resilient plug 18 is expanded within the pipe 16 that an annular crevice 27 is formed between the torus shape of the expanded plug 18 and the inner wall of the pipe. When foreign particles lodge within this crevice it is very difficult to remove them even by vacuuming. The result with prior art plugs is ultimate contamination of the piping system upon withdrawal of the plug. In order to overcome this problem the present invention provides a wiper means which will wipe the interior wall of the pipe completely free of any foreign particles upon withdrawal of the resilient plug 18. This may be accomplished by providing a rigid washer 28 which is slidably mounted on the shaft 22 between the nut 26 and the resilient plug 18 so that the washer 28 comes into engagement with both the resilient plug 18 and the nut 26 at opposite bearing surfaces. The washer 28 will distribute the force from the nut 26 to the resilient plug 18. Mounted about the washer 28 is a cup shaped resilient ring 30 which may be bonded to the exterior diameter of the washer 28 or resiliently held in place by mating engagement within an annular washer recess 32. As illustrated in FIG. 1, the ring 30 has an exterior diameter which is greater than the exterior diameter of the resilient plug 18 when the plug is in its retracted condition. The washer 28 has an exterior diameter which is less than the plug 18 when the plug is in its retracted condition. The cavity of the cup which is formed by the washer 28 and the ring 30 is on the bearing side of the nut 26 so that a barrier is formed in front of the crevice 27. The ring 30 will wipe the interior wall of the pipe 16 free of any foreign particles when the plug 18 is withdrawn from the pipe.

The pipe closure apparatus 10 of FIGS. 1 and 2 is the type which will be used in a pipe when work is being done in the area surrounding the pipe. The other embodiment of this invention, which will be described in detail hereinafter in FIGS. 3 and 4, is utilized when an end portion of the pipe is machined. In the embodiment of FIGS. 1 and 2 a steel wire 34 may be connected to the nut end of the shaft 22. At the free end of the wire 34 there may be connected a loop type handle 36. The wire 34 and handle 36 enable withdrawal of the closure means 12 and execution of the wiping action by ring 30 when it is desired to open the pipe 16.

A unique wrench 14 for expanding and retracting the closure means 12 is illustrated on the right side of FIG. 1. The wrench 14 in combination with a pin 38 serve as a means for retaining the shaft 22 and selectively tightening or loosening the nut 26. The pin 38 extends from one side of the shaft 22 at the end outside of the nut 26. The wrench 14 includes a tube 40 which has a shaped end 42 for engaging the nut 26 and retaining its position. Radially extending handles 44 may be mounted to the opposite end of the tube 40 for accomplishing this function. The wrench 14 further includes another tube 46 which is slidably mounted within the exterior tube 40 and has a shaped end 48, such as perpendicular slots, for engaging the pin 38. The interior tube 46 may be provided with radially extending handles 50 for rotating the shaft 22 relative to the nut 26. The exterior tube 40 may be counterbored and the interior tube 46 may be provided with an enlarged end for providing a stop at 52 so that the interior tube 46 will be retained within the exterior tube 40. In order to accommodate the wire 34 both of the tubes 40 and 46 are longitudinally slotted along their entire lengths, the tube 40 being slotted at 53 and the tube 46 being slotted at 54.

In the operation of the embodiment of the invention illustrated in FIGS. 1 and 2, the wrench 14 is engaged with the closure means 12 taking care to align the slots 53 and 54 and lay the wire 34 therethrough into the interior of the tubes 40 and 46. The shaped end 42 of the tube 40 engages the nut 46 and the shaped end 48 of the tube 46 engages the pin 38. The closure means 12 is then inserted a desired distance in the pipe 16 (see FIG. 2). The handles 44 and 50 are then counter-rotated by holding one or the other stationary so as to expand the resilient plug 18 within the pipe until tight engagement is made with the interior wall thereof. The wrench 14 is then removed from the pipe and the wire 34 is simultaneously removed from the tubes 40 and 46 via the slots 53 and 54. Work can then be accomplished in the area surrounding the pipe 16 and the piping system will be kept completely free from contamination except for the portion of the pipe between the closure means 12 and the end of the pipe. The period of the outside work may be several weeks and foreign particles will enter the pipe in this outer portion. When the outside work has been completed, the wrench 14 is once again inserted into the pipe 16 with the wire laid through the slots 53 and 54, and the handles 44 and 50 are counter-rotated to change the resilient plug 18 to its relaxed condition. The annular wiper end of the resilient ring 30 is still in engagement with the interior wall of the pipe. After the wrench 14 is disengaged the user simply pulls the closure means 12 from the pipe 16 by the handle 36 which causes the resilient ring 30 to wipe the interior wall of the pipe completely free of any foreign particles. After removal of the pipe closure 12 the pipe can then be closed or connected back to its main component for operational purposes.

In some instances, machining will be performed on an end portion of the pipe 16, such as threading, chamfering, or grinding. In many of the piping systems aboard ship it is imperative that particles due to this machining not drop into the system since they may destroy very expensive power units and components. The embodiment of the invention illustrated in FIGS. 3 and 4 is utilized for sealing an end portion of a pipe 16 so that these machining type functions can be accomplished without contamination of the piping system. This embodiment of the invention is a pipe closure apparatus 52 which includes a closure means 54 and a wrench means 56. The closure means 54 is identical to the closure means 12 of FIG. 1 with the exception that a pin 58 extends diametrically in opposite directions from the shaft 22. As will be explained in detail hereinafter, this provides a key so that only the wrench 56 can remove this type of closure means. This prevents unauthorized withdrawal of the closure means 54 by the utilization of the other wrench 14.

The wrench 56 in combination with the pin 58 serve as a means for retaining the shaft 22 and selectively tightening or loosening the nut 26. The wrench 56 includes a tube 59 which has a shaped end 60 for engaging the nut 26. Another tube 62 is slidably mounted within the exterior tube 59 and is provided with a shaped end 64, such as a bayonet connection, for engaging the pin 58. The outer tube 59 is provided with radially extending handles 66, and the interior tube 62 is similarly provided with radially extending handles 68. A stem 70 is threaded into the interior wall of the interior tube 62 and has an end 72 which is adapted to tightly engage the exterior end 74 of the shaft 22 so as to lock the wrench 56 to the closure means 54 when the shaped end 64 of the interior tube is engaged with the pin 58. The stem 70 may be provided with an enlarged knurled end 76 for implementing this locking operation.

In the operation of the embodiment illustrated in FIGS. 3 and 4 the wrench 56 is brought into engagement with the closure means 54 prior to insertion of the closure means into the pipe 16. The shaped end 60 of the exterior tube 59 is brought into engagement with the nut 26 and the shaped end 64 is brought into bayonet connection with the pin 58. The stem 70 is then screwed inwardly until a tight engagement is made with the end 74 of the shaft 22 so that the bayonet connection between the shaped end 64 and the pin 58 becomes a rigid connection. While holding the wrench 56 the closure means 54 is then inserted a desired depth within the pipe 16 and the handles 66 and 68 are counter-rotated so as to cause the resilient plug 18 to expand and come into tight sealing engagement with the interior wall of the pipe 16. Machining type work can then be performed on the outer end portion of the pipe 16 and the piping system is kept free of contamination except for the end portion outside located between the closure means 54 and the end of the pipe. The wrench 56 is removed from the closure means 54 by simply unscrewing the stem 70 so as to release the bayonet connection between the shaped end 64 and the pin 58. After the desired work has been performed, the wrench 56 is inserted into the pipe, the nut 26 is engaged and the bayonet connection is made with the pin 58. The stem 70 is screwed inwardly to make a rigid connection and the handles 66 and 68 are counter-rotated to retract the resilient plug 18 so that it can be withdrawn. Upon withdrawing the closure means 54 the ring 30 maintains its resilient engagement with the interior wall of the pipe 16 so as to wipe this wall completely free of any foreign particles.

It is now readily apparent that the pipe closure apparatuses provide a simple and yet effective means for protecting the cleanliness integrity of piping systems. The embodiment illustrated in FIGS. 1 and 2 protect the piping system while work is being accomplished in the area surrounding the pipe and the embodiment illustrated in FIGS. 3 and 4 protect the piping system while an end portion of the pipe is being machined. The wrenches 14 and 56 in combination with pins 38 and 74 provide a keyed relationship so that only the wrench 14 can be used on the closure means 12 and the wrench 56 can only be used on the closure means 54. This prevents an unauthorized removal of the closure means by different types of workmen on the job.

Obviously, many modifications and variations of the present invention are possible in the light of the above teachings, and, it is therefore understood that within the scope of the disclosed inventive concept, the invention may be practiced otherwise than specifically described.

We claim:

1. A pipe closure apparatus comprising:

a resilient plug;

a threaded shaft extending axially through the resilient plug;

means mounted on one end of the shaft to restrain longitudinal movement of the shaft with respect to the resilient plug, and a nut threaded on the opposite end of the shaft so that upon tightening or loosening the nut the resilient plug expands or retracts respectively;

a rigid washer slidably mounted on the shaft between the nut and the resilient plug for providing bearing surfaces and a distribution of force from the nut to the resilient plug;

a cup shaped resilient ring mounted about the washer; and said ring having an exterior diameter which is greater than the resilient plug when the plug is in its retracted condition and being capable of flexing inwardly, means for retaining the shaft and selectively tightening or loosening said nut;

the retaining, tightening, and loosening means including:

a tube which has a shaped end for engaging the nut;

a pin extending from the nut end of the shaft; and another tube slidable within the first mentioned tube and having a shaped end for engaging said pin, whereby a pipe can be sealed from contamination by expanding the plug therein and is wiped clean by the ring when the plug is retracted and withdrawn.

2. A pipe closure apparatus as claimed in claim 1 including:

a retrieval wire connected to the nut end of the shaft; and both tubes being longitudinally slotted for the insertion of said wire to pull the shaft and plug from the cavity.

3. A pipe closure apparatus as claimed in claim 1 including:

a stem threaded axially through the interior tube and engagable with the nut end of the shaft.

* * * * *